US006945691B2

United States Patent
Trapasso et al.

(10) Patent No.: US 6,945,691 B2
(45) Date of Patent: Sep. 20, 2005

(54) METHOD AND APPARATUS FOR INFERRING A TEMPERATURE

(75) Inventors: David J. Trapasso, Bloomfield, NY (US); Kenneth J. Dauer, Avon, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/305,993

(22) Filed: Nov. 27, 2002

(65) Prior Publication Data

US 2004/0101030 A1 May 27, 2004

(51) Int. Cl.[7] .............................. G01K 1/16; G01K 7/00
(52) U.S. Cl. ..................... 374/15; 374/165; 374/134; 374/1; 374/112
(58) Field of Search ............................... 374/15, 185, 1, 374/172, 110, 112, 115, 144, 145, 29, 30, 43, 44, 165, 134, 135, 166

(56) References Cited

U.S. PATENT DOCUMENTS

| | | | | |
|---|---|---|---|---|
| 3,095,743 A | * | 7/1963 | Teasel et al. | 374/110 |
| 3,724,267 A | * | 4/1973 | Zoschak | 374/30 |
| 3,981,187 A | * | 9/1976 | Howell | 73/152.13 |
| 4,563,098 A | * | 1/1986 | Bartran | 374/172 |
| 4,595,300 A | * | 6/1986 | Kaufman | 374/170 |
| 4,826,326 A | * | 5/1989 | Reynolds et al. | 374/5 |
| 5,656,771 A | * | 8/1997 | Beswick et al. | 73/118.1 |
| 5,669,337 A | * | 9/1997 | Drouillard | 123/41.15 |
| 5,720,554 A | * | 2/1998 | Smith et al. | 374/15 |
| 5,743,646 A | * | 4/1998 | O'Connell et al. | 374/148 |
| 5,821,861 A | * | 10/1998 | Hartog et al. | 340/584 |
| 5,879,082 A | | 3/1999 | Smitherman et al. | |
| 6,220,750 B1 | * | 4/2001 | Palti | 374/164 |
| 6,272,735 B1 | * | 8/2001 | Moriwake et al. | 374/185 |

FOREIGN PATENT DOCUMENTS

| | | |
|---|---|---|
| DE | 3048361 | 7/1982 |
| JP | 56066826 | 6/1981 |

* cited by examiner

*Primary Examiner*—Gail Verbitsky
*Assistant Examiner*—Mirellys Jagan
(74) *Attorney, Agent, or Firm*—Paul L. Marshall

(57) ABSTRACT

A heat-conducting element having known length D is disposed at a first end in a first region having a first temperature $T_1$ to be inferred. The second end of the element is disposed in a second region having a measureable second temperature $T_2$ different from the first temperature. The element is well-insulated between the first and second regions. Heat flows along the element from the higher temperature region to the lower temperature region, and the temperature of the element at any point along the element is proportional to the temperature difference between the two regions and the distance from either one of the regions. By measuring the second temperature and also a third temperature $T_3$ at a point along the element, and knowing accurately the position $D_n$ of that point with respect to the first and second ends of the element, the first temperature can be inferred by proportionality.

2 Claims, 1 Drawing Sheet

1

METHOD AND APPARATUS FOR INFERRING A TEMPERATURE

TECHNICAL FIELD

The present invention relates to measurement of temperatures; more particularly, to devices for determining temperatures remotely; and most particularly, to method and apparatus for inferring an elevated temperature from the differential between two lower measured temperatures.

BACKGROUND OF THE INVENTION

In devices which operate at elevated internal temperatures, for example, a solid oxide fuel cell (SOFC) or a hydrocarbon catalytic fuel reformer operating at, for example, 900° C., it can be important for monitoring and control purposes to determine continuously the internal temperature. In the prior art, thermocouple devices typically are used to measure such elevated temperatures. However, thermocouples are known to have low signal output and to be significantly non-linear in their response, requiring special conditioning of the signal for meaningful measurement. Further, the signal is vulnerable to electrical noise in practical applications. Also in the prior art, thermistors or resistance temperature devices (RTDs) are known to be operationally superior to thermocouples, but the problem with these devices is that they typically are limited to temperatures of less than about 300° C.

What is needed is an improved apparatus, having substantially linear response, and method for determining accurately any temperature within a range of temperatures, especially temperatures elevated beyond the range of measurement for thermistors and RTDs.

It is a principal object of the present invention to provide an improved method and apparatus for determining elevated temperatures.

It is a further object of the invention to provide such apparatus and method wherein such elevated temperature is characteristic of a region not readily accessible to prior art temperature measuring means.

It is a still further object of the invention to provide such apparatus and method which can reliably provide continuous determination of the internal temperature of a fuel cell or hydrocarbon reformer.

SUMMARY OF THE INVENTION

Briefly described, a heat-conducting element, such as a metal rod, is disposed at a first end in a first region having a first temperature to be determined by the method of the invention. The second end of the element is disposed in a second region having a second temperature different from the first temperature, the second temperature being measurable by known means. The element is well-insulated between the first and second regions. Heat flows along the element from the higher temperature region to the lower temperature region, and the temperature of the element at any point along the element is proportional to the temperature difference between the two regions. Therefore, by measuring the second temperature and also a third temperature at a point along the element, and knowing accurately the position of that point with respect to the first and second ends of the element, the first temperature can be inferred by proportionality.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
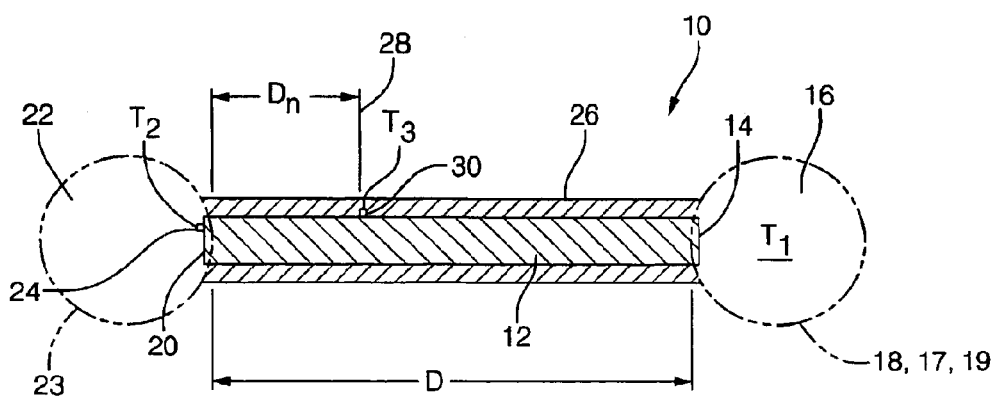
FIG. 1 is a schematic drawing of a temperature determining apparatus in accordance with the invention.

Referring to FIG. 1, a temperature measuring system 10 in accordance with the invention is provided for determining by inference a temperature $T_1$ in a first thermal region 16 of a device 18, such as, for example, fuel cell 17 or fuel reformer 19. System 10 includes a thermally-conductive element 12, for example, a rod formed of a suitable metal such as stainless steel and having a constant cross-sectional area. Element 12 has a first end 14 disposed in region 16 of device 18, such as within a reforming chamber of a hydrocarbon fuel reformer or an SOFC, and a second end 20 disposed in a second thermal region 22, such as within an automotive cooling system 23. A first temperature measuring device 24, for example, a thermistor or RTD, is attached to element 12 in region 22 at a known distance D from region 16 for measuring the actual temperature $T_2$ of element 12 in region 22. In a currently preferred application, first temperature $T_1$ of region 16 is higher than second temperature $T_2$ of region 22, although the reverse condition is contemplated within the scope of the invention. Element 12 is thermally insulated uniformly along its entire length by insulative cover 26 between regions 16 and 22 to prevent heat loss from the surface of element 12 as heat flows along the element between region 16 and region 22.

At a point 28 designated $D_n$ along element 12 between first and second ends 14,20, a second temperature measuring device 30, for example, a thermistor or RTD, is attached to element 12 for measuring a third temperature $T_3$ at that point, $D_n$ being a known fractional distance of distance D.

In accordance with Fourier's Law of Heat Conduction, heat flow in a conducting element is directly and linearly proportional to the temperature gradient:

$$q = kA(dt/dx) \tag{Eq. 1}$$

wherein q is heat flow, k is a proportionality constant, A is the cross-sectional area of an element, and dt/dx is the temperature gradient along the element. Since the temperature gradient is linear, dt/dx for element 12 may be determined by substituting $T_2$, $T_3$, and $D_n$:

$$dt/dx = (T_3 - T_2)/D_n \tag{Eq. 2}$$

Since gradient dt/dx is constant over length D, as are constants k and A, then $$(T_3 - T_2)/D_n = (T_1 - T_2)/D \tag{Eq. 3}$$

which may be rearranged to solve for $T_1$, the temperature within region 16:

$$T_1 = [(D/D_n)(T_3 - T_2)] + T_2 \tag{Eq. 4}$$

Thus, a method in accordance with the invention for determining by inference a first temperature $T_1$ in a first region includes the steps of:

a) providing an insulated thermally-conductive element having a known length D and extending into the first region such that an exposed first end of the element is at first temperature $T_1$;

b) extending the conductive element from the first region into a second region having a second temperature $T_2$ such that an exposed second end of the element is at second temperature $T_2$;

c) determining second temperature $T_2$;

d) determining a third temperature $T_3$ at a known distance $D_n$ along the element from the second region; and e) calculating first temperature $T_1$ from the relationship $$T_1=[(D/D_n)(T_3-T_2)]+T_2.$$

Figure 2:
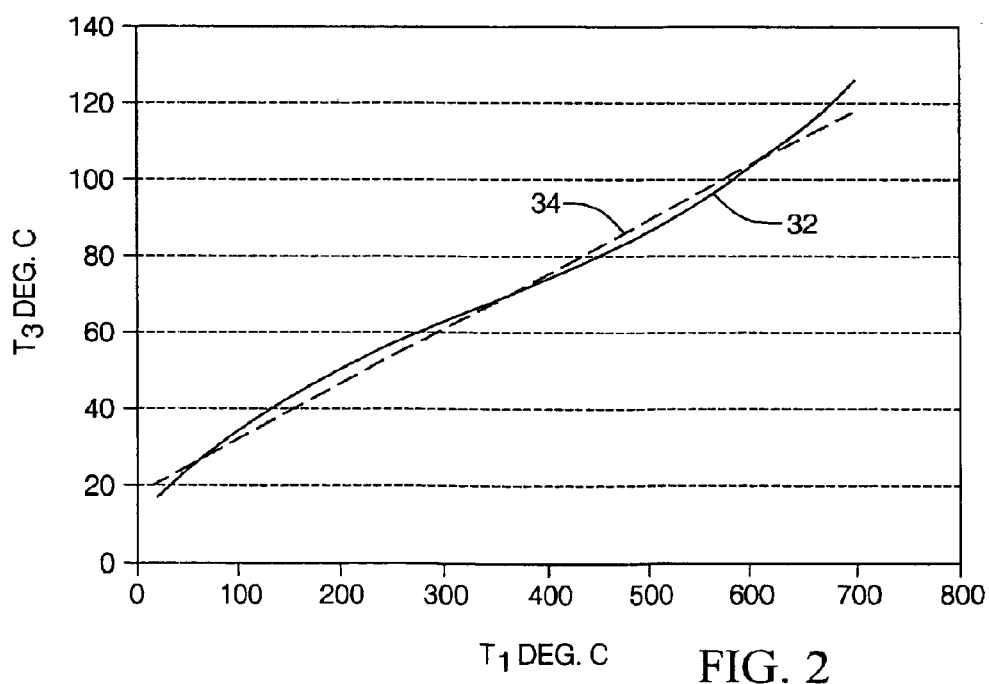
FIG. 2 is a graph showing variation in the third temperature as a function of variation in the first temperature.

Referring to FIG. 2, for an element 12 arranged in accordance with FIG. 1 (with $T_2$ held constant), curve 32 shows resulting values of $T_3$ as a function of actual imposed values of $T_1$. Curve 34 represents an ideal linear relationship in accordance with Eqs. 1 through 4. Deviations from linearity in curve 32 represent imperfections in the test installation. In practice, however, any such non-linearities may be dealt with readily by calibration in known fashion. For example, curve 32 may be represented by the polynomial expression $$T_3=4E-07T_1^3-0.0004T_1^2+0.2564T_1+11.857 \quad \text{(Eq. 5)}$$

It is seen that the second and third order terms are essentially insignificant and that linear expression provides an excellent approximation of temperature $T_1$ over a wide range of temperatures. Of course, accuracy is improved as $D_n$ becomes a larger percentage of D; however, one purpose of the invention is to be able to accurately infer temperatures near 1000° C. from temperature measurements which can be made below 300° C. by inexpensive, reliable low-temperature devices such as thermistors and RTDs.

Further, in actual use wherein $T_1$ is the dependent variable, the axes would be reversed, and x-axis values of $T_3$ would be used to predict y-axis values of $T_1$.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for determining by inference a first temperature $T_1$ in a first thermal region, comprising the steps of:

a) providing a thermally-conductive element having a known length D and extending said element into said first thermal region such that an exposed first end of said element is at said first temperature $T_1$ to be inferred;

b) extending said conductive element from said first thermal region into a second region having a second temperature $T_2$ such that an exposed second end of said element is at said second temperature $T_2$, wherein said thermally-conductive element is covered with an insulative covering and extends substantially the entire length between said first and second thermal regions;

c) determining said second temperature $T_2$;

d) determining a third temperature $T_3$ at a known distance $D_n$ along said element from said second region;

e) establishing an ideal linear relationship between said first temperature $T_1$ and said third temperature $T_3$ from the relationship $$T_1=[(D/D_n)(T_3-T_2)]+T_2;$$

f) establishing an actual relationship between said first temperature $T_1$ and said third temperature $T_3$ by maintaining said second temperature $T_2$ at a constant temperature, imposing known values of said first temperature $T_1$, and measuring said third temperature $T_3$;

g) comparing said ideal linear relationship with said actual relationship to determine non-linearity characteristics of the actual relationship and h) calculating said first temperature $T_1$ using the actual relationship, and compensating the calculated first temperature $T_1$ to remove the non-linearity characteristics.

2. A method in accordance with claim 1 wherein said first temperature $T_1$ is calculated using the actual relationship $T_1=4E-07T_3^3-0.0004T_3^2+0.2564T_3+11.857$.

* * * * *